LARGE SCREEN TELEVISION SYSTEMS

Filed April 7, 1971 4 Sheets-Sheet 1

INVENTORS:
DONALD S. OLIVER,
JERROLD R. ZACHARIAS,
BY John E. Toupal
ATTORNEY

INVENTORS:
DONALD S. OLIVER,
JERROLD R. ZACHARIAS,
BY John E. Toupal ATTORNEY

LARGE SCREEN TELEVISION SYSTEMS

Filed April 7, 1971 4 Sheets-Sheet 3

INVENTORS:
DONALD S. OLIVER,
JERROLD R. ZACHARIAS,
BY John E. Toupal ATTORNEY

INVENTORS:
DONALD S. OLIVER,
JERROLD R. ZACHARIAS,
BY John E. Toupal ATTORNEY

United States Patent Office 3,712,954

Patented Jan. 23, 1973

3,712,954

LARGE SCREEN TELEVISION SYSTEMS

Donald S. Oliver, Acton, and Jerrold R. Zacharias, Belmont, Mass., assignors to Itek Corporation, Lexington, Mass.

Filed Apr. 7, 1971, Ser. No. 132,020
Int. Cl. H04n 9/12
U.S. Cl. 178—5.4 BD 27 Claims

ABSTRACT OF THE DISCLOSURE

Disclosed are display systems for producing large, high intensity images in either black and white or color. High intensity beams of polarized light scan a display screen and are amplitude modulated by valves comprising electro-optical/photoconductive elements.

BACKGROUND OF THE INVENTION

This invention relates to display devices, and more particularly to large screen television equipment.

In addition to the well known entertainment medium, the uses of television have expanded into a variety of other fields including, for example, general communications, instruction, area monitoring, etc. This expansion was accelerated by the advent of color television. For certain applications, particularly in the area of group instruction, the use of a large viewing screen is desirable. For example, the entire seating capacity of a large classroom or auditorium can be accommodated by a single display of sufficient size. However, large screen television has not been generally accepted because large conventional kinescopes, or picture tubes, lack the necessary brightness. Therefore, rather than one large screen such as is found in a movie theater, the less desirable arrangement of a plurality of small screens, distributed throughout the room, is generally used. Utilization of color television for large screen applications is hampered not only by a low intensity, but also by a lack of resolution. This lack of resolution results from the use in a conventional color kinescope of three separate images, one for each of the primary colors, red, blue and green. The single spot used for a black and white picture is replaced by three, which, when perceptually small blend, but when perceptually large create an undesirable grainy effect.

The acceptability of any conventional color television is further limited in applications requiring high color fidelity. Color, in a color television camera, is separated by optical filters, while conventional color television receivers produce color by a controlled change of energy level in certain phosphors on the picture tube. Light so produced may not exactly match the spectral color transmitted by the optical filters in the camera.

An object of this invention, therefore, is to provide a display system capable of producing a high intensity, bright picture on a large screen area. A further object is to provide a display system of the above type which can provide large colored displays with high resolution and color fidelity.

SUMMARY OF THE INVENTION

This invention is characterized by a display system for producing a television picture on a large display screen. The image is formed by a modulated beam of light which scans the screen in the same manner that a television picture tube is scanned. The beam is formed by collimated, polarized light which strikes a planar crystal having both electro-optical properties and photoconductive properties responsive to ultraviolet radiation but transparent to visible light. The crystal, when activated, alters the polarization of plane polarized light incident thereon. The output light next strikes an analyzer that passes only that light component for which the plane of polarization has been suitably shifted. In one embodiment the crystal is formed by adjacent layers of an electro-optical material and a photoconductive material. A modified crystal embodiment comprises a pair of layers of a material having both electro-optic and photoconductive properties, the layers having identical optical response but having fast-slow axes relatively shifted by 180°. In both embodiments, the crystal is activated by the simultaneous application of an electric field across both layers and ultraviolet radiation to one of the layers. By employing a scanning beam of ultraviolet radiation activation is restricted to discrete scanned areas on the crystal. Consequently, the output of the crystal is a column of light that follows movement of the scanning beam.

According to one preferred embodiment of the invention, a photoconductive layer of the crystal is scanned with a constant intensity beam of ultraviolet radiation, thereby controlling the position of the output beam while a synchronized video signal is applied across the crystal to control output intensity. In another embodiment, a constant voltage electric field is impressed across the crystal and the photoconductive layer is scanned by a variable intensity beam of ultraviolet radiation that controls both position and intensity of output.

One feature of the invention is the utilization of a kinescope to produce the ultraviolet scanning beam. Kinescopes are inexpensive and readily available in a variety of sizes. They can be easily and accurately scanned by the incorporation of conventional synchronization circuits.

Another feature of the invention is the utilization and adaptation of a conventional television receiver to serve as the source of both the ultraviolet scanning beam and the video signal. The picture tube provides the scanning beam and is disposed so as to project the beam directly on the crystal. The video signal is either applied directly across the crystal as in the first embodiment described above or is used to intensity modulate the scanning beam as in the second described embodiment. Utilization of a television receiver assures correct synchronization between the scanning spot and the video level. Furthermore, the receiver's audio system is available for any accommodating sound portion of a presentation.

A further feature of the invention is the utilization of a plurality of similar, but independently controlled channels to produce beams which simiiltaneously scan the display screen and are superimposed thereon to form the image. Separate paths for each of the primary colors can thereby be provided, and a full color picture produced.

Yet a further feature of this invention is the utilization and adaptation of a conventional color television receiver to serve as a control signal source. Advantages previously listed for a black and white receiver are realized and, in addition, the receiver color decoder circuits provide three independent outputs, one representing the intensity of each of the primary colors.

Still a further feature of this invention is the incorporation in the above described system of optical filters to separate colors in the individual light channels. The filters are selected to match the optical filters used in a color television camera, and therefore provide color fidelity not possible in a conventional television system.

DESCRIPTION OF THE DRAWINGS

These and other objects and features of the present invention will become more apparent upon an examination of the following description taken in conjunction with the accompanying drawings wherein.

DESCRIPTION OF THE PREFERRED EMBODIMENTS

Figure 1:
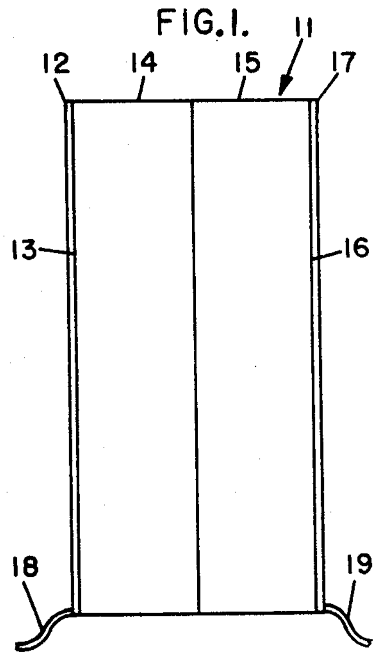
FIG. 1 shows a side view of electro-optic photoconductive crystal used in the invention.

Referring now to FIG. 1 there is shown a diagram of an electro-optical/photoconductive crystal 11 which is used as a light valve element in a light modulator, described below. Electro-optical/photoconductive crystals are not considered part of the invention per se, however, a basic understanding of their operation is necessary to comprehend the operation of the claimed invention. The crystal 11 is a multilayer device comprising a transparent electrode 12 on an input face 13 of a layer of photoconductive material 14. Disposed next to the photoconductive layer 14, and in intimate contact with one side thereof is an electro-optically active layer 15 having an output surface 16 covered by another transparent electrode 17. Wires 18 and 19 are connected to electrodes 13 and 17 respectively. The property of an electro-optically active crystal with which this invention is concerned is the ability of such a crystal, when subjected to an electric field, to create eliptically polarized output light from plane polarized input light. An electro-optical/photoconductive crystal can selectively perform this rotation at a single discree point as described hereinafter.

One method of fabrication of such a crystal 11 involves joining together an electro-optically active layer 15, which may be composed of compounds such as potassium dihydrogen orthophosphate, known as KDP, or deuterated potassium dihydrogen orthophosphate, known as DKDP, and a photoconductive layer 14, which may be composed of compounds such as zinc sulphide or zinc selenide. Electrodes 12 and 17 can be formed, for example, by evaporating thin layers of substances such as gold or platinum on the surfaces 13 and 16. The compounds suitable for use in the photoconductive layer 14 are transparent to visible light, but display photoconductive properties in response to ultraviolet radiation.

When collimated, plane polarized light strikes the crystal 11 little effect is exhibited and the light passes substantially unchanged. Even if an electrical source is connected to wires 18 and 19 little change occurs. This is because the resistivity of photoconductive layer 14 in the absence of ultraviolet radiation is much higher than the resistivity of electro-optical layer 15. Therefore, little voltage drop is exhibited across electro-optical layer 15, and most of the voltage drop occurs across photoconductive layer 14. However, if a beam of ultraviolet radiation strikes one point on the photoconductive layer 14 the resistivity thereof is reduced substantially. A voltage drop then appears across that discrete portion of the electro-optical layer 15 directly adjacent the point at which the ultraviolet radiation impinges on the face of the photoconductive layer 14. Light passing through crystal 11 is then unchanged except at the point where the ultraviolet energy is striking. There the plane polarized input is changed to eliptically polarized output light with an ellipticity dependent on the strength of the ultraviolet radiation and the voltage applied across the crystal 11.

According to the invention, either of two systems can be used to control the degree of light modulation produced by the crystal 11. In one system a beam of uniform intensity ultraviolet radiation is applied to the crystal's face 13 shown in FIG. 2 and a variable electrical signal is applied across wires 18 and 19. The portion of the photoconductive layer 14 on which the scanning beam impinges then exhibits a lower resistivity and the light output from the adjacent portion of the electro-optical layer 15 is conrolled by the voltage applied. For example, if the electrical signal value is low, the intensity of the rotated component of elliptically polarized light transmitted by the crystal 11 will be low. However, as the value of the applied signal increases, the degree of ellipticity and therefore the intensity of the rotated component of light passing through the particular point at which the ultraviolet beam is striking also increases. According to another modulation control system, a constant voltage is applied to wires 18 and 19, and a variable control signal is used to intensity modulate the beam scanning the face of the photoconductive layer 14 shown in FIG. 2. As the beam intensity increases, the resistivity of layer 14 decreases thereby enhancing the effect on polarized light passing therethrough. Conversely, as the beam intensity decreases, the resistivity of the photoconductive layer 14 increases to reduce the crystal's effect on transmitted light. Both of these modulation systems will be described more fully below in connection with specific embodiments of the invention.

Figure 3:
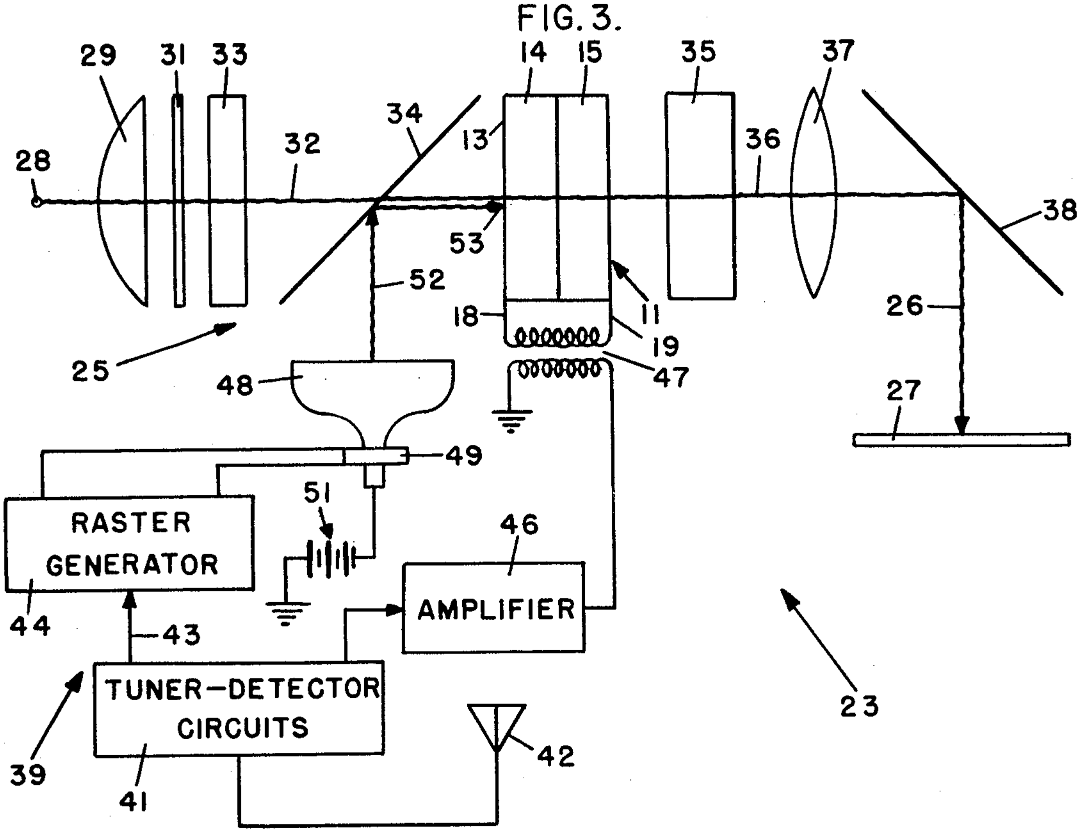
FIG. 3 is a schematic illustration of a preferred display system in which a video signal is applied directly across the crystal shown in FIG. 1.

Referring now to FIG. 3 there is shown schematically a display system 23 utilizing an electro-optical crystal 11 of the type shown in FIG. 1 as a light valve element in a light modulator 25. A beam of light 26, which scans a display screen 27, is generated by a light source 28. A collimator 29 and a filter 31 which removes ultraviolet radiation, are adjacent to the light source 28. Light 32 which passes through the filter 31 enters the light modulator 25 and first impinges upon a polarizer 33, then passes through a one-way mirror 34. Next, the light 32 passes through the electro-optical/photoconductive cell 11 and out of the modulator 25, into an analyzer 35. Only light for which the plane of polarization has been rotated 90° after leaving the polarizer 33 passes through analyzer 35. Light 36 which passes through the analyzer 35 is relayed by a lens 37 onto the display screen 27 via a mirror 38.

Also included in the display system 23 is a conventional television receiver 39. A circuit network 41 comprises tuner, intermediate frequency, and detector circuits of the television receiver 39. Connected to the network 41 is an antenna 42. synchronization signals from networks 41 are transmitted by a cable 43 to a raster generator 44. Module 41 also serves as a video signal source and is coupled by wire 45 to a video supply amplifier 46. The amplified video signal is then applied to cell 11 by an electrical supply system including a transformer 47 and the wires 18 and 19. Deflection signals from the generator 44 are applied to deflection coils 49 of a kinescope 48, causing the kinescope to scan in the manner of a conventional television receiver. A constant voltage source 51 produces a scanning beam 52 of uniform intensity. The beam 52 is reflected by the mirror 34 so as to scan the input face 13 of the crystal 11.

During operation of the embodiment shown in FIG. 3, light 32 from the source 28 is first collimated by the collimator 29 and, after the removal of ultraviolet components by the filter 31, is polarized by the polarizer 33. The light beam 32 is unaffected by the one-way mirror 34, and therefore bathes the input face 13 with uniform, collimated and polarized light which is transmitted by the crystal 11. In the absence of crystal activation, however, the transmitted light is blocked by the analyzer 35 so that no light reaches the display screen 27. When the television receiver 39 is turned on, and tuned to a station, the kinescope 49 operates in the conventional manner, to produce the beam 52 that is reflected by one-way mirror 34 and scans discrete portions 53 of the input face 13. The ultraviolet content of the beam 52 lowers the resistivity of these impinged portions of the photoconductive layer 14 as hereinbefore described. As the kinescope 48 scans, only one point 53 on the input face 13 is impinged by ultraviolet energy 52 and, therefore, only one portion of the photoconductive layer 14 exhibits a lowered resistivity to permit activation of the directly adjacent portion of the electro-optic layer 15. Thus, the beam 52 controls the position of the light output for the analyzer 35. Obviously, that output scans the screen 27 with the scanning pattern of the kinescope 48. During this scanning operation the synchronized video output signal of the television receiver 39 is applied to the transformer 47. For each position of the spot 52 on the face 13, therefore, there is applied across the crystal 11 a voltage dependent on the light intensity desired at the corresponding position on the screen 27. Since the light 32 striking the input face 13 at each photoconductively activated point 53 will have its plane of polarization rotated to a degree dependent on the voltage then being applied across the crystal 11, the light output of the analyzer 35 is intensity modulated in accordance with the video output signal from the receiver 39. Consequently, an appropriately intensity modulated light beam is synchronously traced on the display screen 27 as kinescope 48 scans.

Figure 4:
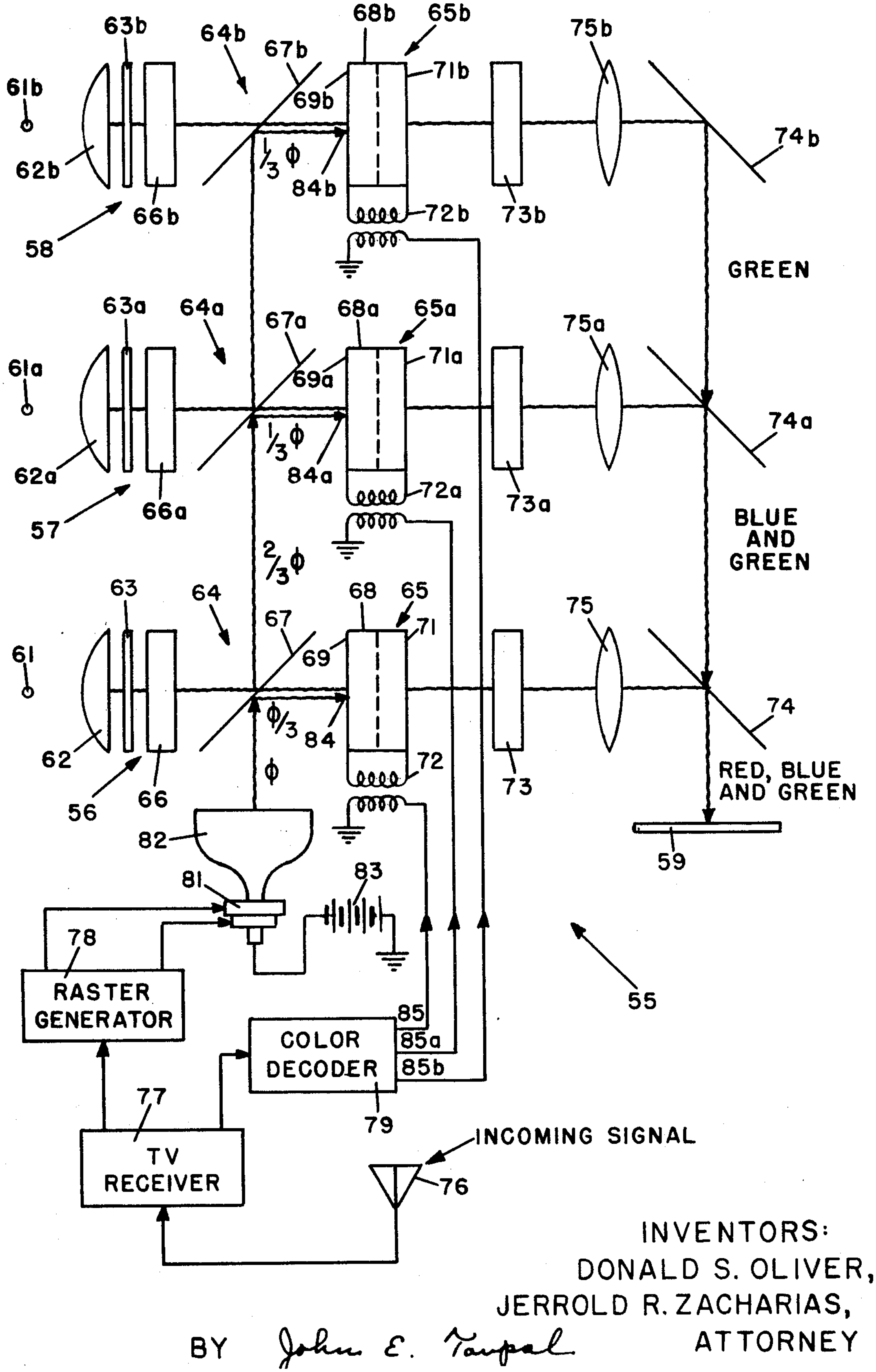
FIG. 4 is a schematic illustration of another preferred invention embodiment employing three separate light paths similar to the single path shown in FIG. 3.

Referring now to FIG. 4, there is shown another preferred embodiment 55 of the invention. This embodiment 55 is an additive, full color television display system. Provided are three separate light path channels 56, 57 and 58, one for each of the primary colors red, blue and green, respectively. Each channel 56, 57 and 58 focuses a beam of light on a display screen 59, where all beams synthesize a full color picture. Each channel 56, 57, 58 is similar to the light modulator embodiment 23 shown in FIG. 3. Path 56, for red light, will be described in detail, and similar components of paths 57 and 58 will be numbered correspondingly except that the reference numerals for components of path 57 will be suffixed with an *a*, and the reference numerals for components of path 58 will be suffixed with a *b*. Components denoted by corresponding reference numerals are to be considered identical unless differences are specifically noted.

Light, from a source 61 passes through a collimator 62 to a filter 63. Ultraviolet radiation is removed by the filter 63 which is preferably, a bandpass filter, passing only red light. The beam of collimated, monochromatic light then enters a light modulator 64, which includes a light valve 65 identical to the crystal 11 shown in FIG. 1. In the modulator 64, light first passes through a polarizer 66. The polarized, collimated, and monochromatic light is then transmitted by a beam splitter 67 to the valve 65. The beam splitter 67 also transmits to beam splitter 67*a* two-thirds of the light energy in a scanning beam received from a kinescope 82. The remaining one-third is reflected onto the face of the valve 65. Similarly, the beam splitter 67*a* reflects one-third of the original scanning beam onto the valve element 65*a* and transmits the remaining one-third to the beam splitter 67*b* for reflection onto the valve element 65*b*. Thus, the ultraviolet radiation present in the scanning beam produced by the kinescope 82 is diverted by the beam splitters 67–67*b* into three paths of equal intensity parallel to and superimposed on the monochromatic light provided by the sources 61, 61*a* and 61*b* in light channels 56–58, respectively.

As described above in connection with FIG. 1, transparent electrodes on an input face 69 and on an output face 71 of the valve crystal 65 are connected to a transformer 72. As in embodiment 23 shown in FIG. 3, the valve 65 modulates light in the path 56 under the influence of the ultraviolet-energy directed on face 69 and the voltage applied across faces 69 and 71. Only that light for which the plane of polarization is rotated 90° is transmitted by the analyzer 73. That light is received by a dichroic beam splitter 74 after being focused by a lens 75. The dichroic beam splitter 74 both reflects red light received from light path 56 and transmits blue and green light received from the dichroic beam splitter 74*a*. In an analogous manner, the dichroic beam splitter 74*a* both reflects blue light received from light channel 57 and transmits green light reflected from light channel 58 by a mirror 74*b*. Thus, the red, blue and green components produced by light channels 56–58, respectively, are all combined for display on the screen 59.

An antenna 76 is connected to the turner, intermediate frequency stages and detectors of a conventional color television receiver 77. Receiving sync signals from the receiver 77 is a raster generator 78. A video output signal from the receiver 77 is fed into a color decoder 79 of the type employed in conventional color television receivers. The outputs of the decoder 79 on lines 85, 85*a*, 85*b* are video signals corresponding to the three primary colors red, blue and green and are applied, respectively, to transformers 72, 72*a* and 72*b*. Thus, the decoder signal source 79 impresses an electric field between the input and output faces of each crystal proportional to the desired intensity of the primary color transmitted thereby. Receiving the outputs of the generator 78 are deflection coils of a deflection yoke 81 mounted on a conventional black and white kinescope 82. Obviously, the receiver 77, the decoder 79 and the kinescope 82 can be components of a single color television set. A constant voltage source 83 supplies power to the cathode of the kinescope 82, producing a raster of uniform intensity.

During typical operation of the embodiment 55 shown in FIG. 4, television receiver 77 is tuned to a commercial television station, or to a closed circuit program. As kinescope 82 scans, the light energy transmitted therefrom is reflected across discrete portions 84, 84*a* and 84*b* of input faces 69, 69*a* and 69*b* as previously described. The faces 69, 69*a* and 69*b*, therefore, are scanned by synchronized patterns corresponding to the scan produced on the kinescope 82. As described above in relation to FIG. 1, the resistivity of the photoconductive layers 68, 68*a* and 68*b* is lowered to permit activation of the adjacent electro-optical layers only at the discrete points 84–84*b* being impinged by the ultraviolet light in the scanning beam produced by the kinescope 82. Again, the degree of activation and accordingly the intensity of light output from the valves 65, 65*a* and 65*b* is determined by the voltage level impressed across the valves by the signals on lines 85, 85*a* and 85*b*. Each path 56, 57 and 58 is therefore scanned simultaneously and produces a picture in one of the three primary colors, and the three pictures are superimposed on display screen 59, synthesizing a large color television picture.

Figure 5:
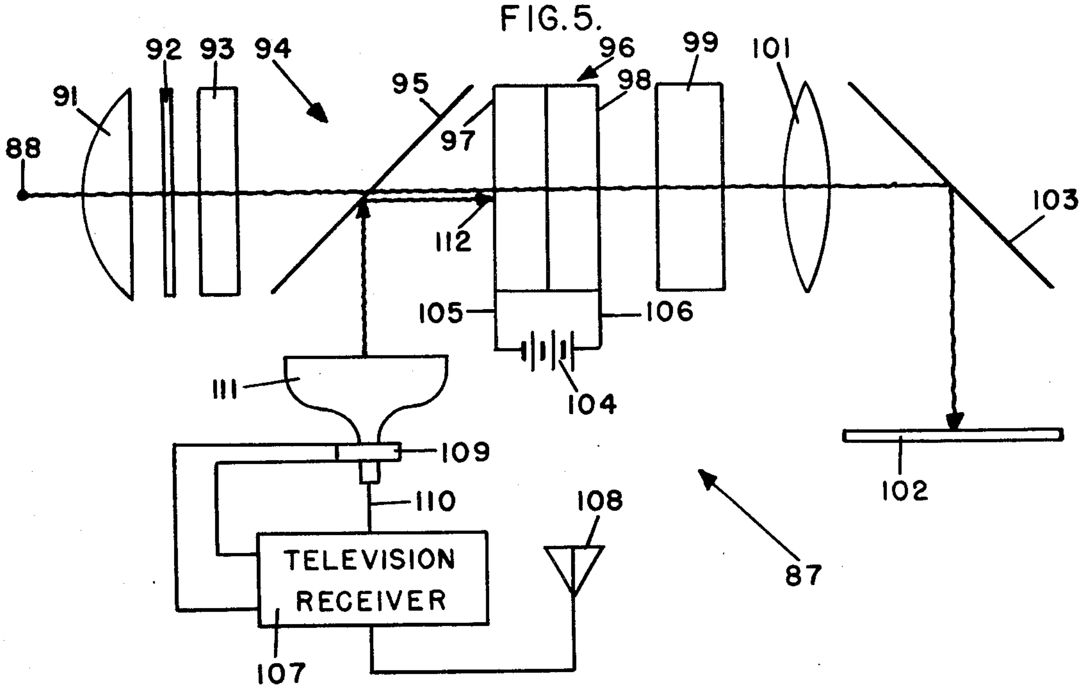
FIG. 5 schematically illustrates another preferred embodiment of the invention in which a video signal is used to intensity modulate a scanning beam applied to the crystal shown in FIG. 1.

Referring now to FIG. 5 there is shown another preferred embodiment 87 of the invention. Light, from a source 88 passes through a collimator 91 and an ultraviolet filter 92 to a polarizer 93, which is part of a light modulator 94. A one-way mirror 95 is disposed so as to transmit light received from the polarizer 93 and to reflect light received from a kinescope 111. Both the light transmitted and reflected by the mirror 95 is directed onto an input face 97 of an electro-optical/photoconductive crystal 96 identical to the crystall 11 shown in FIG. 1. Only light having its plane of polarization rotated 90° by the crystal 96 is transmitted by an analyzer 99. That light is focused by a lens 101 on a display screen 102 after reflection by a mirror 103. A fixed bias voltage from an electrical source 104 is applied by output wires 105 and 106 to the transparent electrodes on the input face 97 and the output face 98. An antenna 108 is connected to a conventional television receiver 107 that applies a video signal to the cathode of the kinescope 111 on line 110. Also applied to deflection coils in a yoke 109 are synchronzied deflection signals. The kinescope 111 is disposed so that light produced on its screen is reflected onto the input face 97 by mirror 95. Thus, the kinescope 111 provides a scanning spot 112 that is reflected onto the face 97 in a pattern determined by the deflection signals applied to yoke 109 and of an intensity determined by the variable video signal on line 110.

During operation of the embodiment 87, electrical bias source 104 impresses an electric field across the electro-optical/photoconductive crystal 96. As described in relation to FIG. 1, the voltage drop across crystal 96 occurs primarily across its photoconductive layer because of its higher resistivity. At discrete points of the face 97 struck by the scanning spot 112, however, the ultraviolet content of the spot lowers the resistivity of the photoconductive layer to thereby activate the directly adjacent portion of the electro-optic layer. The activated portion of the electro-optical layer then converts the plane polarized input light received from the source 88 into eliptically polarized output light whose minor axis component is transmitted by the analyzer 99. The degree of ellipticity is dependent upon the intensity of the ultraviolet radiation which is in turn determined by the video signal on line 110. Thus, the output of the analyzer 99 is a beam of light corresponding in position and intensity to that of the spot produced by the kinescope 111 but of greatly amplified intensity because of the high power source 88. It will be obvious that the operation of embodiment 87 is similar to that of embodiment 23 shown in FIG. 3 except that intensity modulation is obtained by varying the intensity of the ultraviolet scanning spot rather than by varying the electric field applied across the valve crystal.

Figure 6:
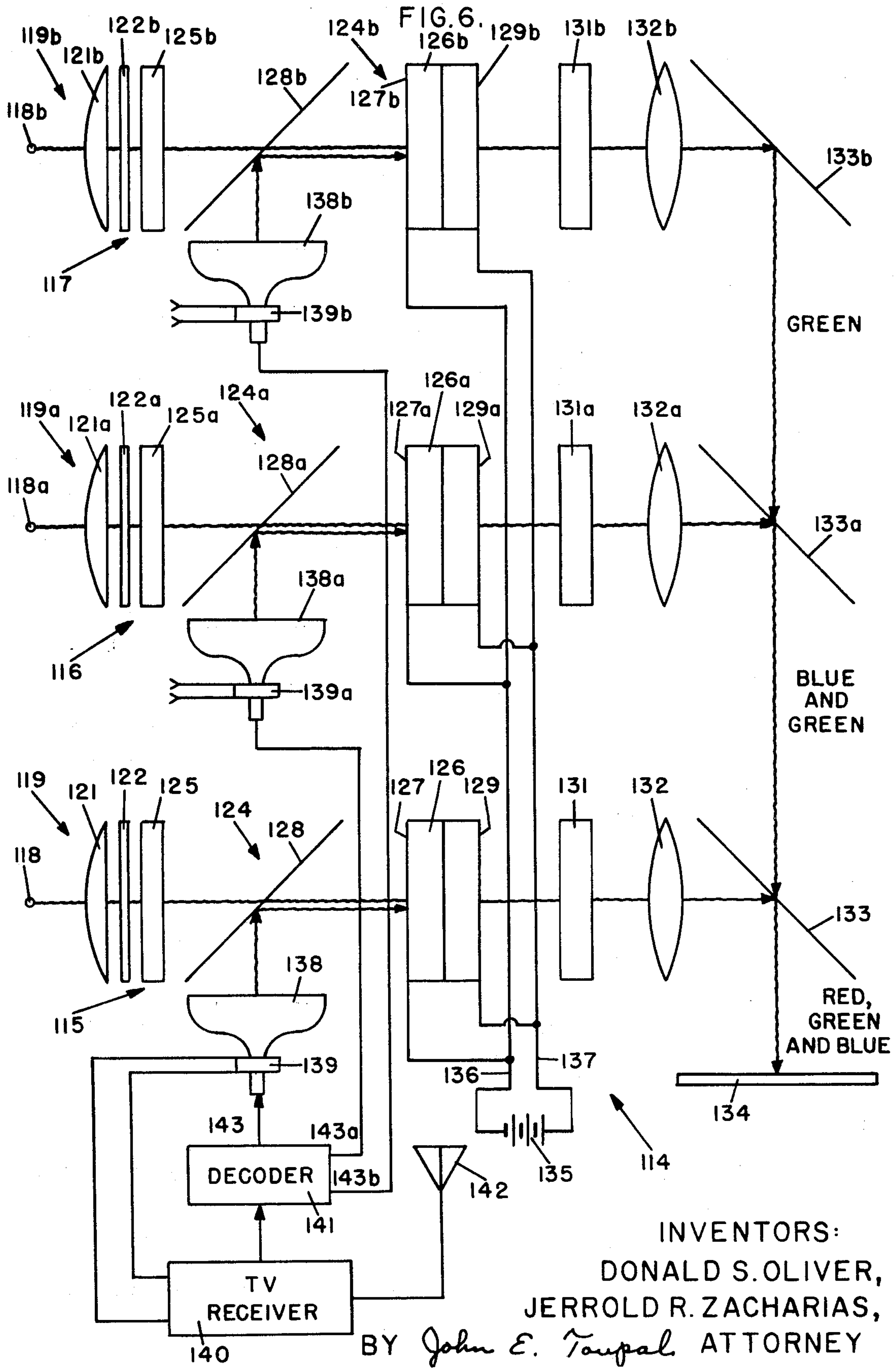
FIG. 6 schematically illustrates another preferred embodiment of the invention similar to that shown in FIG. 5 but employing three separate light projection paths.

Referring now to FIG. 6 there is shown a fourth preferred embodiment 114 of the invention. This embodiment 114 is also an additive color television system comprising three paths 115, 116 and 117, one for each of the primary colors red, blue and green respectively. Path 115 will be described in detail, and corresponding parts in paths 116, and 117 will be given identical reference numerals, except for inclusion of a suffix *a* for path 116 and a suffix *b* for path 117. Components in each path with corresponding numerals are identical unless otherwise stated.

Light generated by lamp 118 of a discrete light source 119 passes through a collimator 121 and a filter 122. Filter 122 removes ultraviolet radiation and preferably transmits only red light. The corresponding filters 122*a* and 122*b* in paths 116 and 117 also reject ultraviolet but transmit only blue and green light, respectively. Thus, the paths 115–117 are collimated beams of light for each of the primary colors. The red light in path 115 enters a light modulator with a light valve 124 including a polarizer 125 and an electro-optic/photoconductive crystal 126 indentical to the crystal 11 shown in FIG. 1. Between the polarizer 125 and an input face 127 of the crystal 126 is a beam splitter 128. The splitter 128 both transmits light from the source 119 to the input face 127 and reflects thereto light received from a kinescope 138. Light transmitted by the output face 129 of the crystal 126 strikes an analyzer 131 that passes only that component of light for which the plane of polarization has been rotated 90° after plane polarization in the polarizer 125. That light passed by the analyer 131 is relayed by a lens 132 to a dichroic beam splitter 133 that reflects red light onto a display screen 134. The beam splitter 133 also transmits to the screen 134 both blue light reflected by the dichroic beam splitter 133*a* from the path 116, and green light reflected from path 117 by the mirror 133*b* and transmitted by the beam splitter 133*a*. Thus, the red, blue and green light from paths 115, 116 and 117, respectively, are combined by the mirror 133*b* and the beam splitters 133 and 133*a* for simultaneous display on the screen 134.

A fixed bias voltage from an electrical source 135 is applied by wires 136 and 137 across the transparent electrodes disposed on input faces 127, 127*a* and 127*b* and output faces 129, 129*a* and 129*b*. The resultant electric field prepares the crystals 126, 126*a* and 126*b* for activation in the manner described above for the embodiment 87 shown in FIG. 5. Disposed near each beam splitter 128, 128*a* and 128*b*, respectively, is a conventional black and white kinescope 138, 138*a* and 138*b*, each supporting a deflection yoke 139, and 139*a* and 139*b*. A conventional color television receiver 140 is connected to an antenna 142, and the sync output thereof is applied to the deflection coils in each yoke 139, 139*a* and 139*b*, causing each kinescope 138, 138*a* and 138*b* to scan in synchronism. Receiving a video signal for the receiver 140 is a conventional color decoder that provides on lines 143, 143*a* and 143*b* signal levels corresponding to desired intensities of the primary colors red, blue and green. These signals are applied, respectively, to the cathodes of the kinescopes 138, 138*a* and 138*b*. As the kinescopes 138, 138*a* and 138*b* simultaneously scan, the ultraviolet energy containing light produced thereby is reflected by beam splitters 128, 128*a* and 128*b* onto discrete portions of input faces 127, 127*a* and 127*b*.

During operation of the embodiment 114 described above, television receiver 141 is tuned to a commercial television station or a closed circuit source. The kinescopes 138, 138*a* and 138*b* display black and white images of identical form but with intensities that correspond respectively, to those desired for each primary color component of the full color picture. Each light valve element 124, 124*a* and 124*b* responds in the same manner as the light valve element in the embodiment 87 described in FIG. 5, producing an intensity amplified output for one of the three component colors. The outputs in paths 115, 116 and 117 converge as described above on screen 134, and there synthesize a full color picture.

Figure 2:
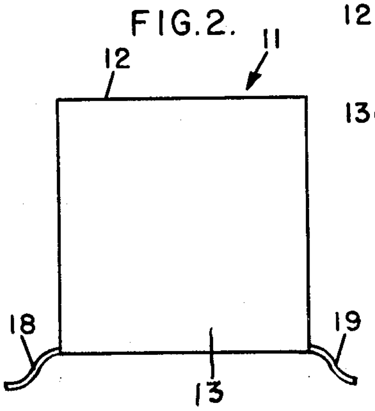
FIG. 2 is a front view of the crystal shown in FIG. 1.
Figure 7:
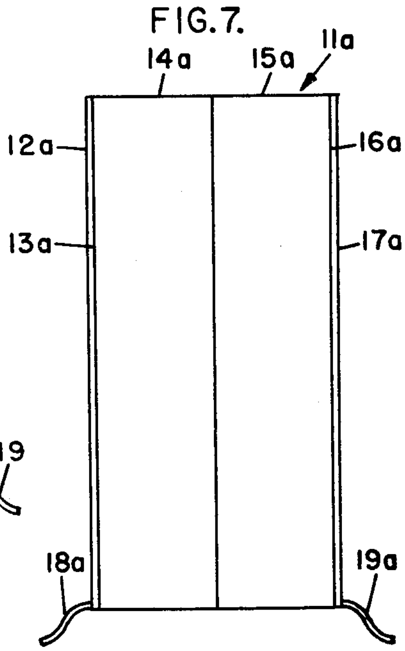
FIG. 7 schematically illustrates a modified crystal for use with the invention embodiments shown in FIGS. 3–6.

FIG. 7 illustrates a modified light valve element 11*a* that functions similarly to the crystal 11 shown in FIGS. 1 and 2. The element 11*a* is formed by electro-optic/photoconductive layers 14*a* and 15*a* that may comprise, for example, zinc sulfide or zinc selenide and each have both electro-optic and photoconductive properties of the type disclosed in U.S. Pat. No. 3,517,206. Transparent electrodes 12*a* and 17*a* are formed on the surfaces 13*a* and 16*a*, respectively, of the layers 14*a* and 15*a*. As above, the electrodes 12*a* and 17*a* can be obtained by evaporating thin layers of gold or platinum on the layers 14*a* and 15*a*. An electric field can be applied across the element 11*a* via leads 18*a* and 19*a* connected, respectively, to the electrodes 12*a* and 17*a*.

Figure 8:
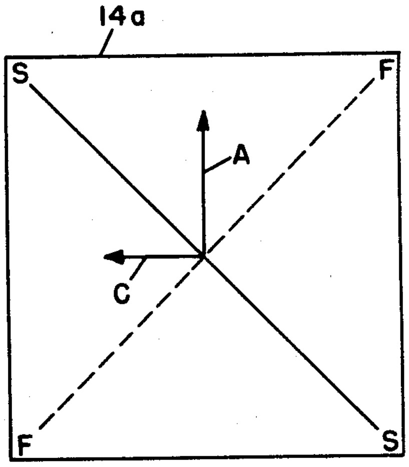
FIGS. 8 and 9 diagrammatically illustrate optical properties of the crystal shown in FIG. 7.
Figure 9:
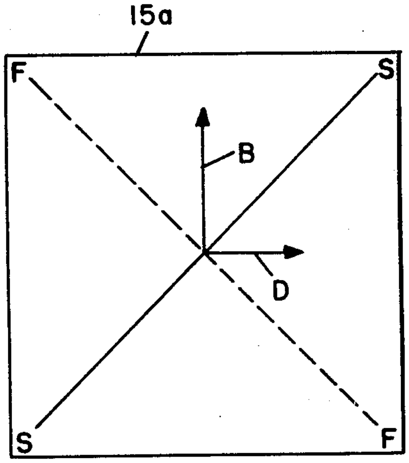

As described in above noted U.S. Pat. No. 3,517,206, the layers 14*a* and 15*a* are birefringement and, therefore, transpose polarized light into phase shifted orthogonal components along fast and slow axes. The result is elliptically polarized light with the elliptical eccentricity being a function of the magnitude of relative phase shift introduced which is in turn a function of the electric fluid applied across the electro-optic material. According to the instant invention, the layers 14*a* and 15*a* are identical except for the relative orientation of their fast and slow axes. As diagrammatically illustrated in FIGS. 8 and 9, the crystal 11*a* is formed such that the fast axis of layer 14*a* is parallel to the slow axis of layer 15*a* and vice versa. Because of these relative axes orientations, the layers 14*a* and 15*a* produce phase shifts of opposite sense. Thus, in response to plane polarized input light bisecting the axes F—F and S—S, the layers 14*a* and 15*a*, respectively, will produce light components A and B unidirectional with the input light and oppositely directed components C and D orthogonal thereto. Assuming an equal level of birefringence in each of the identical layers 14*a* and 15*a*, the magnitudes of unidirectional components A and B will be equal as will those of oppositely directed components C and D. The components C and D will cancel, therefore, and the output of the crystal 11*a* will be plane polarized light identical to the input. Thus, the crystal 11*a* in combination with a suitable output analyzer will effectively block transmission of plane polarized light from a source such as the sources 56–58 in FIG. 4 and **119–119*b*** in FIG. 6.

However, a beam of ultraviolet radiation incident on a discrete point on the face **13*a* will generate electron carriers that propagate into the perpendicularly aligned section of the crystal 11*a* increasing its electrical conductivity. Assuming a limited level of incident ultraviolet energy, the electron carrier distribution will produce in the activated section an electrical conductivity gradient decreasing between the input face 13*a* and the output face 16*a*. Any voltage applied between the terminals 18*a* and 19*a*, therefore, will be unevenly distributed through the activated section with a larger voltage drop occurring across the layer 15*a* than across the layer 14*a*. These different voltages will cause the layer 15*a* to exhibit a higher level of birefringence than the layer 14*a*. Thus, conversely to the conditions assumed above in FIGS. 8 and 9, plane polarized input light will be transformed by the layers 14*a* and 15*a*, respectively, into oppositely directed components C and D of unequal magnitude resulting in a net light component output orthogonally related to the input light. Since this orthogonal component can be passed by a suitable analyzer, it will be obvious that the crystal 11*a* can be employed in the systems shown in FIGS. 3–6 in the same manner as described above in connection with the crystal 11 shown in FIGS. 1 and 2. Again, a scanning beam of ultraviolet radiation is used to position the output of the crystall 11*a*** while the intensity of the output is controlled by the signal level applied across the crystal.

Although similar in its operation to the crystal 11 shown in FIGS. 1 and 2, the crystal **11*a* offers several distinct advantages. Because electro optic-photoconductive materials used for the crystal layers 14*a* and 15*a* are cubic, the crystal 11*a* is isotropic and has no natural birefringence that would result in large output fall-offs with variations in the axis of input light. Consequently, input light need not be highly collimated and accurately aligned permitting the use of inexpensive, high power arc lamps as sources. Also, the identical material layers forming the crystal 11*a* can be physically joined more easily than can the dissimilar material layers forming the crystal 11**.

Obviously, many modifications and variations of the present invention are possible in light of the above teachings. For example, in certain applications it can be desirable to address the output faces of the valve crystals with ultra violet light rather than their input faces as shown in the illustrated embodiments. It is to be understood, therefore, that the invention can be practiced otherwise than specifically described.

What is claimed is:

1. A display system comprising:

(a) light modulating means including a light valve element having input and output faces, said element comprising a pair of electrically connected material layers each of said layers being composed of materials having both photoconductive and substantially identical electro-optic birefringent properties that establish orthogonally related fast and slow optical axes transverse to polarized input light, and wherein said fast axis of one layer is substantially parallel to said slow axis of the other layer;

(b) light source means for directing polarized input light onto said input face of said valve element;

(c) analyzer means for analyzing polarized light received from said output face of said valve element;

(d) electrical means for applying an electrical potential across said photoconductive and electro-optically active material layers and between said input and output faces; and (e) radiant energy source means for selectively directing radiant energy onto discrete portions of said valve element so as to activate the photoconductive properties of one of said layers to reduce the electrical resistance of said discrete portions relative to directly adjacent portions of the other layer thereby increasing the electro-optic responsiveness of said adjacent portions to any given electrical potential applied by said electrical means.

2. A display system according to claim 1 wherein said radiant source means comprises a radiant energy scanning beam producing means disposed to direct a scanning beam across one surface of said element.

3. A display system according to claim 2 wherein said one and said other layers in each pair are both composed of materials having both photoconductive and substantially identical birefringent properties that establish orthogonally related fast and slow optical axes transverse to said plane polarized input light, and wherein said fast axis of said one layer is substantially parallel to said slow axis of said other layer.

4. A display system according to claim 2 including a signal source means coupled to said beam producing means, said signal source means comprising a raster generator for producing deflection signals and a video signal source for producing a video signal synchronized with said deflection signals, and wherein said deflection signals are applied to said beam producing means so as to control movement of said beam on said input face.

5. A display system according to claim 4 including video supply means for applying said video signal to said electrical means for application across said valve element.

6. A display system according to claim 4 including a bias source means for applying a biasing potential to said electrical means, and video supply means for applying said video signal to said beam producing means so as to control the intensity of said beam directed across said element.

7. A display system according to claim 4 wherein said radiant energy source comprises a cathode ray tube.

8. A display system according to claim 1 including a display means for receiving polarized light passed by said analyzer means.

9. A display system according to claim 8 wherein said display means comprises a display screen and optical means for focusing thereon the polarized light passed by said analyzer means.

10. A display system according to claim 1 wherein said material layers are photoconductively activated only by incident radiation in a given frequency range and is transparent to visible light, said radiant energy source means provides radiant energy in said given frequency range, and radiation in said given frequency range is substantially absent from the light directed by said light source means.

11. A display system comprising:

(a) light modulating means including a plurality of light valve elements each having an input and an output face, each of said elements comprising a pair of electrically connected material layers having photoconductive and electro-optical properties;

(b) light source means for directing plane polarized light onto said input face of each of said valve elements;

(c) analyzer means disposed to receive and analyze polarized light received from each of said valve elements;

(d) electrical means for applying electrical potential across said photoconductive and electro-optically active material layers of each of said valve elements and between its input and output faces;

(e) radiant energy source means for selectively directing radiant energy onto discrete portions of each of said valve elements so as to activate photoconductive properties of one of said layers to reduce the electrical resistance of said discrete portions relative to directly adjacent portions of the other of said layer thereby increasing the electro-optic active material responsiveness of said adjacent portions to any given electrical potential applied by said electrical means; and (f) video signal source means for producing a plurality of discrete video signals including video supply means for applying each of said discrete video signals to said electrical means for application across a different one of said valve elements.

12. A display system according to claim 11 wherein said radiant energy source means comprises radiant energy scanning beam producing means disposed to direct scanning beams across scanning surfaces of said elements.

13. A display system according to claim 12 wherein said light source means comprises a plurality of discrete sources for directing plane polarized light in a different frequency range to each of said plurality of light valve elements.

14. A display system according to claim 13 wherein said discrete video signals represent different color components of a composite video signal, said light sources of different frequency range represent spectral colors corresponding to said different color components, and the color component applied to each of said valve elements corresponds to the spectral color directed to its input face by said light source means.

15. A display system according to claim 14 including a display means comprising optical means for superimposing on a display area the output light from each of said elements passed by said analyzer means.

16. A display system according to claim 15 wherein said signal source means comprises a television receiver for producing said composite video signal and said deflection signals, and a color decoder for receiving said composite video signal and producing said color components.

17. A display system according to claim 12 including a bias source means for applying a biasing potetial to said electrical means, and video supply means for applying each of said discrete video signals to said beam producing means so as to independently control therewith the intensities of said beams directed onto each of said scanning surfaces.

18. A display system according to claim 17 wherein said light source means comprises a plurality of discrete sources for directing plane polarized light in a different frequency range to each of said plurality of light valve elements.

19. A display system according to claim 18 wherein said discrete video signals represent different color components of a composite video signal, said light sources of different frequency range represent spectral colors corresponding to said different color components, and the color component applied to each of said valve elements corresponds to the spectral color directed to its input face by said light source means.

20. A display system according to claim 19 including a display means comprising optical means for superimposing on a display area the output light from each of said elements passed said analyzer means.

21. A display system according to claim 20 wherein said signal source means comprises a television receiver for producing said composite video signal and said deflection signals, and a color decoder for receiving said composite video signal and producing said color components.

22. A display system according to claim 12 wherein each of said layers is composed of a photoconductive material and said other layer is composed of an electro-optically active layer.

23. A display system according to claim 22 wherein said photoconductive material layers are photoconductively activated only by incident radiation in a given frequency range and are transparent to visible light, said radiant energy source means provides radiant energy in said given frequency range, and radiation in said given frequency range is substantially absent from the light directed by said light source means.

24. A display system according to claim 23 wherein said radiation in said given frequency range comprises ultraviolet radiation.

25. A display system according to claim 12 wherein said radiant energy source comprises a cathode ray tube.

26. A display system comprising:

(a) light modulating means including a light valve element having input and output faces, said element comprising a pair of electrically connected material layers, one of said layers having photoconductive properties and the other of said layers having electro-optic properties, and both of said layers being electrically-blocking media for preventing charge leakage to maintain the electric field applied thereacross for a substantial period of time;

(b) light source means for directing polarized input light onto said input face of said valve element;

(c) analyzer means for analyzing polarized light received from said output face of said valve element;

(d) electrical means for applying an electrical potential across said photoconductive and electro-optically active material layers and between said input and output faces; and (e) radiant energy source means for selectively directing radiant energy onto discrete portions of said valve element so as to activate the photoconductive properties of one of said layers to reduce the electrical resistance of said discrete portions relative to directly adjacent portions of the other of said layer thereby increasing the electro-optic responsiveness of said adjacent portions to any given electrical potential applied by said electrical means.

27. A display of claim 26 wherein said photoconductive layers comprises zinc sulfide or zinc selenide.

References Cited

UNITED STATES PATENTS

| | | | |
|---|---|---|---|
| 3,449,583 | 6/1969 | Eden | 350—150 |
| 3,153,146 | 10/1964 | Lady | 350—150 |
| 3,588,324 | 6/1971 | Marie | 178—5.4 BD |
| 2,705,903 | 4/1955 | Marshall | 178—5.4 BD |
| 3,475,736 | 10/1969 | Kurtz | 350—150 |

RICHARD MURRAY, Primary Examiner

U.S. Cl. X.R.

178—7.3 D, 7.5 D